United States Patent [19]

Lohr, Jr.

[11] 4,329,439

[45] May 11, 1982

[54] PROCESS FOR POLYMERIZING DIENES

[75] Inventor: Delmar F. Lohr, Jr., Akron, Ohio

[73] Assignee: The Firestone Tire & Rubber Company, Akron, Ohio

[21] Appl. No.: 250,348

[22] Filed: Apr. 2, 1981

Related U.S. Application Data

[62] Division of Ser. No. 153,477, May 27, 1980, Pat. No. 4,280,927.

[51] Int. Cl.$^3$ .................. C08F 136/04; C08F 136/06; C08F 136/08; C08F 4/48
[52] U.S. Cl. .................................................... 525/180
[58] Field of Search .......................................... 526/180

[56] References Cited

U.S. PATENT DOCUMENTS 3,451,988 6/1969 Langer ...................... 252/431 N X
3,639,380 2/1972 Screttas ...................... 252/431 L X
4,280,927 1/1981 Lohr ................................... 526/180

Primary Examiner—William F. Hamrock

[57] ABSTRACT

The catalyst system disclosed herein comprises a combination or a chelate of a hydrocarbyl lithium compound with a dialkylaminoaldehyde dialkyl acetal having the formula $R'_2N-A-CH(OR_2)$ wherein R and R' are alkyl groups of 1-3 carbon atoms and A is a divalent aliphatic group of 1-10, preferably 1-3 carbon atoms, with a direct linkage of no more than 3 carbon atoms between the N and the $-CH(OR)_2$ group. This catalyst system is particularly useful in the polymerization of vinyl compounds such as ethylene, propylene, styrene, butadiene, etc. The process for the polymerization of conjugated dienes produces polymers of excellent properties. For example, with butadiene-1,3 and other appropriate conditions, polybutadiene with high percentages of 1,2-polybutadiene structure are produced.

12 Claims, No Drawings

PROCESS FOR POLYMERIZING DIENES

This is a division of application Ser. No. 153,477 filed May 27, 1980, now U.S. Pat. No. 4,280,927.

DESCRIPTION

1. Technical Field

This invention relates to a catalyst system suitable for the polymerization of vinyl compounds. More specifically it relates to a chelate of a hydrocarbyl lithium compound and a dialkylaminoaldehyde dialkylacetal. Moreover, this invention relates to a process of polymerizing vinyl compounds using such a catalyst. Still more specifically this process relates to a process of polymerizing conjugated dienes to prepare polymers high in 1,2-polybutadiene content.

2. Background Art

U.S. Pat. No. 3,451,988 describes a polymerization catalyst and a process for polymerizing vinyl compounds therewith that utilizes hydrocarbyl lithium or magnesium compounds together with a bifunctional Lewis base which is described as including tertiary diamines in which the nitrogen atoms in the diamines are bridged by 1-4 carbon atoms. Although the tetramethylethylene diamine (TMEDA) appears to be the preferred diamine since it is used more often in the examples, $R_2N—A—OR$, wherein A includes alkylene groups, is also indicated as suitable.

However, the highest 1,2 contents of polybutadiene reported for TMEDA are the 87.5% and 89% reported in Col. 16. The highest 1,2 content reported in the patent is the 95% reported for tetrahydrofuran (also in Col. 16), but this is associated with a conversion or yield of only 33%. Moreover, with the preferred TMEDA there is subsequent methylation as described in Col. 15 of the patent.

Example 19 (Col. 20) is the only section of the patent in which a compound of the formula $R_2N—A—OR$ is shown in use. In this example the compound $(CH_3)_2NCH_2CH_2OCH_3$ is used. However the maximum 1,2 content is reported as 83% and the maximum conversion of 96% is given.

DISCLOSURE OF THE INVENTION

In accordance with the present invention it has been found that a very effective catalyst system for polymerization comprises the combination of a hydrocarbyl lithium with a dialkylaminoaldehyde diacetal of the formula $R'_2N—A—CH(OR)_2$ wherein R' and R represent alkyl groups of 1-3 carbon atoms and A represents a saturated aliphatic group of 1-10, preferably 1-3 carbon atoms with a direct linkage of 1-3 carbon atoms between the N and the $CH(OR)_2$ group. This catalyst combination is particularly effective in the polymerization of vinyl compounds such as ethylene, propylene, styrene, butadiene, isoprene, etc., and particularly with regard to producing high vinyl polymers from conjugated dienes.

Typical A groups in the above formula for the aminodialkylacetal compounds suitable for the practice of this invention include: $—CH_2—$; $—CH_2CH_2—$; $—CH(CH_3)CH_2—$; $—CH(CH_3)—$; $—CH_2CH(CH_3)—$; $—CH_2CH_2CH_2—$; $—CH(CH_3)CH_2CH_2—$; $—CH_2CH(C_2H_5)CH_2—$; $—CH_2CH_2CH(CH_3)—$; $—CH(C_3H_7)CH_2CH_2—$; $—CH_2CH(CH_3)CH_2—$; $—CH_2CH(C_4H_9)CH_2—$; $—CH(C_5H_{11})CH_2—$; $—CH_2C(C_6H_{13})CH_2—$: etc.

Typical R and R' groups in the above formula are methyl, ethy, n-propyl, isopropyl, n-butyl, isobutyl and t-butyl. Typical dialkylaminoacetaldehyde dialkylacetals suitable for the practice of this invention include dimethylamineacetaldehyde dimethylacetal, dimethylaminoacetaldehyde diethylacetal, diethylaminoacetaldehyde diethylacetal, diethylaminoacetaldehyde dimethylacetal, diisopropylaminoacetaldehyde diethylacetal, dimethylaminoacetaldehyde diisopropylacetal, di-n-propylaminoacetaldehyde di-n-propylacetal, di-isopropylamino-acetaldehyde di-n-butylacetal, di-n-butylacetaldehyde diisobutylacetal, etc. and corresponding derviatives of propionaldehyde, butyroaldehyde, 2-methylpropionaldehyde, 2-ethylpropionaldehyde, 2-propylbutyroaldehyde, 3-propylpropionaldehyde, 4-amylbutyroaldehyde, etc.

The hydrocarbyl lithium compounds may be represented by the formula $R''Li$ wherein $R''$ is a hydrocarbyl radical of 1-20 carbon atoms, advantageously an aliphatic radical of 1-20, preferably 3-6 carbon atoms, but may also be cycloaliphatic or aromatic of 6-20, preferably 6-12 carbon atoms. Preferred $R''Li$ compounds are n-butyl and sec-butyl lithium. Other suitable $R''Li$ compounds include but are not restricted to those in which the R groups are ethyl, n-propyl, isopropyl, n-amyl, sec-amyl, sec-hexyl, n-hexyl, octyl, nonyl, decyl, dodecyl, octadecyl, phenyl, tolyl, dimethylphenyl, ethylphenyl, naphthyl, cyclohexyl, methylcyclohexyl, ethylcyclohexyl, cycloheptyl, allyl, 2-butenyl, 2-methyl butenyl, cyclopentylmethyl, methylcyclopentylethyl, phenylethyl, cyclopentadieneyl, naphthyl, phenylcyclohexyl, etc.

The catalyst components may be premixed or may be added to the solvent in which the polymerization is to be effected or may be added to the solution containing the monomer. Generally the molar ratio of amine compound to $R''Li$ is 0.25-10 moles, preferably 0.5-2 moles per mole of $R''Li$. Advantageously the catalyst is used in a proportion of 0.15-20 millimoles of the $R''Li$ per 100 grams of monomer.

The polymerization is advantageously conducted in a solvent. Hexane is preferred as well as other alkanes, advantageously of 3-20 carbon atoms, preferably 5-10 carbon atoms, such as butane, pentane, heptane, octane, decane, etc. However, other nonaromatic hydrocarbon solvents such as cycloalkanes, e.g., cyclohexane, methylcyclohexane, cycloheptane, etc. may also be preferred. These cycloalkanes advantageously have 6-20, preferably 6-10 carbon atoms. Toluene and other aromatics may act as telomerizing agents and thereby reduce the average molecular weight of the product. However where this is not critical, aromatic solvents may be used. Advantageously a butadiene concentration of 15-50 percent is desirable, preferably about 20-25 percent.

In the catalyst system and polymerization process of this invention it is necessary to take the standard precautions against contamination of an organometallic system with impurities such as water, air, etc. which will deactivate or reduce the efficiency of the system. Consequently the solvent, reagents, reactor and atmosphere in the reactor area are treated accordingly to avoid such contaminants. Advantageously there is less than 25 ppm, preferably less than 5 ppm of water present.

The polymerizations are conducted in autoclaves, pressurized reactors or bottles capable of withstanding the pressures generated at the temperature used.

While a substantial amount of polymerization is effected within one hour, a substantial amount of polymerization is effected within three hours. However, generally six hours or more are desired for greater yields and while polymerization is generally substantially completed within sixteen hours, depending on the temperature, there is no harm or adverse result in allowing polymerization to continue 70 hours or more.

When polymerization is completed, the catalyst is deactivated by the addition of a small amount of alcohol or acid, calculated on the amount of catalyst present. Then the polymer product is recovered by dumping the reaction mass in a large volume of methanol or isopropanol or other low molecular weight alcohol, preferably one containing a small amount, such as 1 percent, of an antioxident, such as di-t-butyl cresol. The precipitated polymer is recovered and dried before processing, preferably by drum drying at an appropriate temperature for evaporation of any remaining solvent.

These catalyst systems are particularly effective in the polymerization of conjugated dienes to high molecular weight polymers of excellent properties. For example, butadiene may be polymerized by these catalysts to excellent yields as high as 100% and at appropriate temperatures to 1,2 configuration of over 90% and even as high as 100%. Other conjugated dienes that may be effectively polymerized by such systems include isoprene, 2,3-dimethyl-butadiene, pentadiene-1,3, 2-phenyl-1,3-butadiene and other conjugated dienes having up to 10 or more carbon atoms. Copolymers may be prepared using two or more of these dienes or a diene with other vinyl compounds such as listed below.

In addition to these dienes, other vinyl monomers may be polymerized by these catalyst systems to high molecular weight polymers. Such other vinyl compounds include ethylene, propylene, butene-1, isobutylene, styrene, vinyl toluene, vinyl naphthalene, etc.

Although butadiene homopolymers are preferred products in the practice of this invention, butadiene copolymers may also be highly desirable where the comonomers impart desirable properties and do not detract from the polymer properties. The comonomers may be olefins, such as butene-1, n-butene-2, isobutylene, n-pentene-1, n-pentene-2 and the like, and preferably vinyl arenes, including vinyl arene or isopropenyl arene derivatives having alkyl, aralkyl, cycloalkyl or chlorine attached to the aromatic nucleus and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl ethyl naphthalene, vinyl methyl naphthalene, vinyl butyl naphthalene, isopropenyl naphthalene, isopropenyl methyl naphthalene, 1-vinyl-4-chloronaphthalene, 1-isopropenyl-b-5-chloronaphthalene, vinyl diphenyl, vinyl diphenylethane, 4-vinyl-4'-methyldiphenyl, 4-vinyl-4'-chlorodiphenyl, and the like. Preferably such comonomers have no more than 12 carbon atoms. Where such comonomers are to be used, generally at least 1 percent, preferably at least 5 percent by weight should be used and as much as 60 percent, preferably no more than 30 percent may be used.

In referring above to millimoles of catalyst this corresponds to the millimoles of lithium components since the catalyst is regarded or at least calculated as a chelate or complex of the Li compound. The anionic polymerization system of this invention permits close control of the molecular weight of the high vinyl polybutadiene. The molecular weight ($M_n$) of the hydrogenated product is advantageously in the range of 50,000–1,000,000, preferably 100,000–1,000,000. Furthermore, narrow molecular weight ranges may be desired for specific properties. Molecular weights reported herein are determined by Dilute Solution Viscosity (DSV).

BEST MODE FOR CARRYING OUT THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

PROCEDURE FOR PREPARATION OF HIGH VINYL POLYBUTADIENE OF CONTROLLED MOLECULAR WEIGHT

The following typical procedure is used to prepare the high vinyl polybutadiene: A cleaned 2-gallon stainless steel reactor equipped with stirrer, appropriate heating and cooling means and appropriate inlets and outlets is prepared for reaction by falling it under a nitrogen atmosphere with hexane and adding n-butyl lithium in an amount sufficient to react with impurities in the hexane and on the surface of the reactor. The mixture is stirred and heated to 150° F. (65° C.) for about an hour. Then this mixture is drained under a nitrogen atmosphere and the material discarded. Next 7.5 lbs. of a blend containing about 24 percent 1,3-butadiene (817 gms. butadiene) and 76 percent of hexane is charged to the reactor under nitrogen and cooled to 41° F. (5° C.) before adding 16.5 millimoles of n-butyl lithium and 33 millimoles of dimethylaminoacetaldehyde diethylacetal (DMAAD). The temperature is maintained at 41° F. (5° C.) and efficient stirring effected. After about 8 hours of reaction the product is dropped into a large volume of isopropanol containing an antioxidant. The precipitated product is recovered and drum-dried to give substantially 100% yield of a polymer having a molecular weight of about 50,000 $M_n$ and a 1,2 content of substantially 90–100%.

The molecular weight may be increased by decreasing the amount of n-butyl lithium and decreased by increasing the amount of n-butyl lithium, advantageously with appropriate changes in the amount of DMAAD to give a DMAAD/Li ratio of approximately 2. This method of varying or controlling the molecular weight by varying the amount of catalyst used per mole of monomer is well known in the anionic polymerization art.

The polmerization temperature has an effect on the 1,2 content of the product with increase in temperature within limits decreasing the 1,2 content, and vice versa, within limits. It is generally preferred to maintain a temperature no higher than 41° F. (5° C.) to obtain maximum 1,2 content. Even where less than maximum 1,2 content is acceptable the temperature is advantageously maintained below 35° C. In most cases the temperature is preferably in the range of −20° C. to 10° C.

In Example II described below the experiments are performed in 28 ounce bottles each capped with a rubber septum through which various additions can be made by hypodermic needle. The bottles are cleaned and dried before use and swept out with nitrogen prior to addition of reagents and a nitrogen atmosphere maintained during polymerization. The product is reduced by dumping into methanol containing 1 percent antioxidant and is drum-dried.

EXAMPLE II

In a series of four experiments, 61 gms. of butadiene as a blend of 23.4 percent 1,3-butadiene in hexane is charged to each 28 bottle and then there is added to each bottle 0.41 millimole of n-butyl lithium and 0.41 millimole of dimethylaminoacetaldehyde diethylacetal both in hexane. The molar ratio is 1 mole of amine modifier per mole of nBuLi. The proportion of nBULi is 0.67 millimole per 100 gms. of butadiene. The bottles are agitated and heated at different temperatures with the reaction time extended for lower temperatures to compensate for slower reaction rate. The conditions and results are as reported in the Table below.

TABLE II

| Run No. | 1 | 2 | 3 | 4 |
|---|---|---|---|---|
| Molar ratio (Amine/RLi) | 1/1 | 1/1 | 1/1 | 1/1 |
| Temp. (°C.) | 5 | 30 | 50 | 70 |
| Polym. Time (hours) | 42 | 41 | 18 | 15 |
| Conversion (%) | 100 | 100 | 100 | 100 |
| % 1,2 | 91.2 | 81.6 | 64.9 | 66.8 |
| DSV | 1.31 | 1.42 | 1.88 | 1.43 |
| Gel (%) | 0.0 | 0.0 | 0.0 | 0.0 |
| GPC Data | | | | |
| $M_n \times 10^{-5}$ | 1.42 | 1.38 | 1.64 | 1.17 |
| $M_w \times 10^{-5}$ | 1.84 | 1.92 | 2.33 | 1.65 |
| $M_w/M_n$ | 1.3 | 1.39 | 1.42 | 1.41 |

EXAMPLE III

The procedure of Example II is repeated with similar results using cyclohexane instead of hexane as the solvent.

EXAMPLE IV

The procedure of Example II is repeated with similar results using the following amine-acetals individually in place of the DMAAD:

(a) Dimethylaminoacetaldehyde dimethylacetal
(b) Diethylaminoacetaldehyde diethylacetal
(c) Diethylaminoacetaldehyde dimethylacetal
(d) Dipropylaminoacetaldehyde diethylacetal
(e) Dimethylaminoproprionaldehyde diethylacetal
(f) Dimethylaminobutyraldehyde diethylacetal

EXAMPLE V

The procedure of Example II is repeated a number of times with similar results using the following alkyl lithium compounds in place of the n-butyl lithium:

(a) Sec.-butyl lithium
(b) n-Amyl lithium
(c) Sec.-amyl lithium
(d) n-Propyl lithium
(e) Isopropyl lithium

EXAMPLE VI

The procedure of Example II is repeated with similar results using isoprene in place of the butadiene.

It may be desirable in some cases to refer to the amine-acetal compounds by their generic chemical names. For example, dimethylaminoacetaldehyde diethylacetal may also be called 1,1-diethoxy-2-(dimethylamino)-ethane; diethylaminoacetaldehyde dimethylacetal may be called 1,1-dimethoxy-2-(diethylamino)-ethane; 3-dimethylaminopropionaldehyde diethylacetal may be called 1,1-diethoxy-3-(dimethylamino)-propane, etc.

While certain features of this invention have been described in detail with respect to various embodiments thereof, it will of course be apparent that other modifications can be made within the spirit and scope of this invention and it is not intended to limit the invention to the exact details shown except insofar as they are defined in the following claims.

What is claimed is:

1. A process for the liquid phase polymerization of a conjugated diene having 4–10 carbon atoms at a temperature of −20° to 150° C. while in intimate contact with a polymerization catalyst, the proportion of said catalyst being in the range of 0.15–20 millimoles of the organo-metal component for 100 grams of said diene, said catalyst comprising (a) an R″Li organometal compound in which R″ is a monovalent hydrocarbyl radical of 1 to 20 carbon atoms, and (b) an amino-acetal compound of the formula R′$_2$N—A—CH(OR)$_2$ wherein R and R′ each represents a saturated aliphatic hydrocarbyl group of 1–3 carbon atoms; A represents a divalent saturated aliphatic hydrocarbon group of 1–10 carbon atoms having 1–3 carbon atoms in direct linkage between said two valencies, the proportion of said amino-acetal compound being 0.25–10 moles per mole of said organo-metal compound.

2. The process of claim 1 in which said diene is isoprene.

3. The process of claim 1 in which said diene is butadiene-1,3.

4. The process of claim 3 in which said A group represents —CH$_2$—.

5. The process of claim 4 in which said temperature is no higher than 35° C.

6. The process of claim 5 in which said temperature is in the range of −20° C. to 10° C.

7. The process of claim 6 in which said butadiene is in hexane solution at a concentration of 15–40 percent by weight.

8. The process of claim 7 in which 0.5–2 moles of organo-metal compound is used per 100 grams of butadiene.

9. The process of claim 8 in which said organo-metal compound is n-butyl lithium.

10. The process of claim 9 in which said amino-acetal is dimethylaminoacetaldehyde diethylacetal.

11. The process of claim 9 in which said amino-acetal is dimethylaminoacetaldehyde dimethylacetal.

12. The process of claim 9 in which said amino-acetal is diethylaminoacetaldehyde diethylacetal.

* * * * *

UNITED STATES PATENT AND TRADEMARK OFFICE
CERTIFICATE OF CORRECTION

PATENT NO. : 4,329,439
DATED : May 11, 1982
INVENTOR(S) : Delmar F. Lohr, Jr.

It is certified that error appears in the above-identified patent and that said Letters Patent are hereby corrected as shown below:

Column 2, line 2

-- ethy -- should read "ethyl"

Column 4, line 30

-- falling -- should read "filling"

Signed and Sealed this

Seventeenth Day of August 1982

[SEAL]

Attest:

*Attesting Officer*

GERALD J. MOSSINGHOFF

*Commissioner of Patents and Trademarks*